ically pure free 3,362,996
N-(2-(2-AMINOETHYLTHIO)ETHYL)ETHYLENE-
DIAMINE AND METHOD OF PREPARATION
Fred N. Teumac, Lake Jackson, Tex., assignor to The
Dow Chemical Company, Midland, Mich., a corporation of Delaware
No Drawing. Filed June 14, 1965, Ser. No. 463,919
2 Claims. (Cl. 260—583)

This invention is directed to the novel compound N-(2-(2-aminoethylthio)ethyl)ethylenediamine and to a method for preparation of said compound.

The compound of the present invention, $C_6H_{17}N_3S$, which corresponds to the structural formula

is useful as a metal complexing agent in acidic solutions. The compound is a viscous, slightly yellow liquid having a boiling point of 120°–126° C. at .4 to .8 mm. Hg and a refractive index at 25° C. equal to 1.5270

$$(n_D^{25} = 1.5270)$$

The following example describes the method employed in preparation of the compound of the present invention.

*Example*

A quantity of 100 ml. of ethanol was placed in a 500 ml. round bottom flask equipped with a condenser, a stirrer, a separatory funnel and a glass frit. A stream of hydrogen sulfide was bubbled through the ethanol to effect saturation of the alcohol with $H_2S$. A solution of 100 ml. of ethylenimine in 125 ml. of ethanol was slowly added to the flask containing $H_2S$-saturated ethanol, with stirring, at a rate which maintained the temperature of the resulting reaction between about 60° and 65° C. This addition was completed in approximately one hour during which time a stream of $H_2S$ was constantly bubbled through the contents of the flask. Upon completion of the ethylenimine-ethanol solution addition, the flask was allowed to cool. A positive $H_2S$ pressure (5 mm. Hg) was maintained for 18 hours after which time the flask contents were subjected to fractional distillation. After removal of the ethanol by distillation at 78° C., 94 grams of thioethylamine was recovered by distillation at a pressure of 1 mm. Hg and at a temperature between 58° and 92° C. A quantity of 11.6 grams of N-(2-(2-aminoethylthio)ethyl)ethylenediamine, the novel compound of this invention, was recovered by distillation at a temperature between about 120° to 126° C. at a pressure of from 0.4 to 0.8 mm. The structure was established by infrared analysis and confirmed by molecular weight determination and by elemental and group analyses.

The molecular weight was determined by ebulliometry in ethanol to be 161 (calculated: 163). Analysis showed 17.23% primary nitrogen (calculated: 17.18%) and 26.61% total nitrogen (calculated: 25.76%). The refractive index (sodium D line at 25° C.) was 1.5270.

The compound of the present invention forms a bright yellow complex with $Cu^{++}$ in HCl. An 0.4 weight percent solution of the N-(2-(2-aminoethylthio)ethyl)ethylenediamine (in aqueous 5 weight percent HCl), successfully prevented deposition of $Cu^{++}$ (present in a concentration of 0.02 weight percent total solution basis) on a steel surface contacting the solution.

I claim:
1. N-(2-(2-aminoethylthio)ethyl)ethylenediamine.
2. A method for preparing N-(2-(2-aminoethylthio)ethyl)ethylenediamine which comprises adding an alkanol solution of ethylenimine to an alkanol saturated with hydrogen sulfide while maintaining the temperature of the resulting reaction mixture between about 60° and 65° C. and recovering N-(2-(2-aminoethylthio)ethyl)ethylenediamine from said reaction mixture.

References Cited

UNITED STATES PATENTS 2,216,958  10/1940  Panniwitz et al. _____ 260—583

CHARLES B. PARKER, *Primary Examiner.*

R. L. RAYMOND, *Assistant Examiner.*